United States Patent
Khan

(10) Patent No.: US 8,845,428 B2
(45) Date of Patent: Sep. 30, 2014

(54) COORDINATING REAL-WORLD GATHERINGS TO PROMOTE ONLINE COMMUNITY

(75) Inventor: Mohammed Khan, San Diego, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 405 days.

(21) Appl. No.: 12/904,077

(22) Filed: Oct. 13, 2010

(65) Prior Publication Data

US 2012/0094763 A1    Apr. 19, 2012

(51) Int. Cl.
    *A63F 9/24*    (2006.01)
    *A63F 13/00*    (2014.01)
    *G06F 17/00*    (2006.01)
    *G06F 19/00*    (2011.01)

(52) U.S. Cl.
    USPC ............................................. 463/31; 463/42

(58) Field of Classification Search
    USPC ....................................................... 463/31, 42
    See application file for complete search history.

(56) References Cited

U.S. PATENT DOCUMENTS

2004/0142750 A1    7/2004    Glisson et al.
2008/0146342 A1    6/2008    Harvey et al.
2009/0017913 A1*    1/2009    Bell et al. ........................ 463/40
2009/0253512 A1    10/2009    Nickell et al.
2010/0227688 A1*    9/2010    Lee et al. ........................ 463/31

OTHER PUBLICATIONS

Ashton, "Interactions, Delegations and Online Digital Games Players in Communities of Practice [1]," May 2009, Journal of Audience & Reception Studies 6(1):1-24.
Cao et al., "A Community Success Model for Gaming Communities," Apr. 2009, Journal of Multimedia 4(2):87-93.
Nardi et al., "Strangers and Friends: Collaborative Play in World of Warcraft," Nov. 4-8, 2006, Proceeding of the Conference on Computer Supported Cooperative Work (CSCW), Banff, Alberta, Canada, pp. 149-158.
Taylor, "Play Between Worlds: Exploring Online Game Culture," 2006, MIT Press, Cambridge, MA.
International Search Report and Written Opinion issued in PCT/US2011/034519 on Jul. 27, 2011, 9 pages.

* cited by examiner

*Primary Examiner* — William M. Brewster
(74) *Attorney, Agent, or Firm* — Procopio, Cory, Hargreaves & Savitch, LLP

(57) ABSTRACT

Coordinating real-world gatherings to promote an online community, the method including: encouraging participants of the online community to participate in a real-world gathering by providing incentives for the participants; promoting familiarity among the participants by providing and introducing online community titles of the participants at the real-world gathering; and providing online benefits or rewards to the participants for participating in the real-world gathering. Keywords include socializing in the real world, community building and bridging the gap between the game world and the real world.

18 Claims, 4 Drawing Sheets

200

REWARD:

PARTICIPANTS ALLOWED TO FORM A
CLAN WITHIN THE ONLINE COMMUNITY

REWARD:

PROVIDE POWER UP BUFF IN THE
ONLINE GAME

FIG. 2B

COORDINATING REAL-WORLD GATHERINGS TO PROMOTE ONLINE COMMUNITY

BACKGROUND

1. Field of the Invention

The present invention relates to promoting social interaction, and more specifically, to coordinating real-world gatherings to promote an online community.

2. Background

The Internet influences our lives to cause tremendous changes in our behavior. For example, online social networks have become the new meeting grounds and have caused many aspects of our everyday lives to change. The Internet is providing instant access to people of similar mindsets, and is enabling us to form partnerships with more people in more ways than ever before.

SUMMARY

The present invention provides for coordinating real-world gatherings to promote an online community.

In one implementation, a method of coordinating real-world gatherings to promote an online community is disclosed. The method includes: encouraging participants of the online community to participate in a real-world gathering by providing incentives for the participants; promoting familiarity among the participants by providing and introducing online community titles of the participants at the real-world gathering; and providing online benefits or rewards to the participants for participating in the real-world gathering.

In another implementation, a non-transitory tangible storage medium storing a computer program for coordinating real-world gatherings to promote an online community is disclosed. The computer program includes executable instructions that cause a computer to: encourage participants of the online community to participate in a real-world gathering by providing incentives for the participants; promote familiarity among the participants by providing and introducing online community titles of the participants at the real-world gathering through a mobile device used by each participant; and provide online benefits or rewards to the participants for participating in the real-world gathering.

Other features and advantages of the present invention will become more readily apparent to those of ordinary skill in the art after reviewing the following detailed description and accompanying drawings.

BRIEF DESCRIPTION OF THE DRAWINGS

FIG. 2A shows a detailed description of the benefit/reward for the participant who checks in at the real-world gathering.

FIG. 2B shows a detailed description of the reward for the participants who play a game at the real-world gathering.

DETAILED DESCRIPTION

Figure 1:
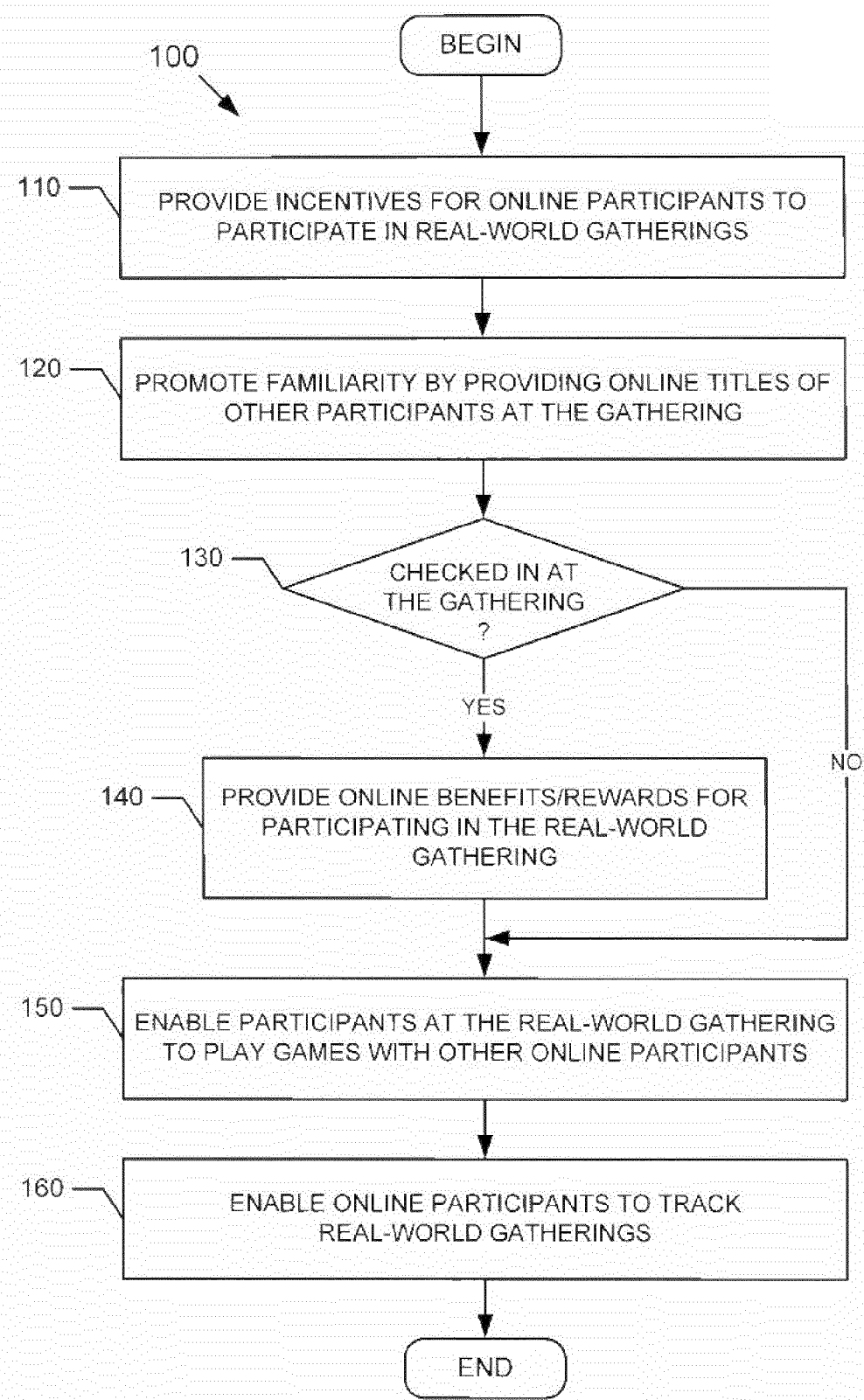
FIG. 1 is a flowchart illustrating a process for coordinating real-world gatherings to promote an online community in accordance with one implementation of the present invention.

Certain implementations as disclosed herein provide for coordinating real-world gatherings to promote an online community including massively multiplayer online games (MMOG). In one implementation, a system can be created which allows players to organize or attend local rally points or gatherings for online players who live in a certain area. The players can be provided with incentives to host and join these gatherings using in-game rewards. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

The game providers are always working to expand the user community of their online games because a strong community leads to increased customers for downloadable contents provided or promoted by the game providers, franchise loyalty, and a rich user experience of their online games. However, making friends through traditional online games is currently limited to people already known to the player in the real world and a few strangers online. This is because it is difficult to form deep connections online with strangers due to anonymity and the lack of real-world connection.

In one implementation, coordinating a real-world gathering involves encouraging players of online game(s) to come to the real-world gathering, and promoting familiarity among the players by introducing titles, characters, and/or guild memberships of the players within the common online game (s) at the real-world gathering. For example, a promoter (e.g., a game service provider) can use the data collected within the online game(s) to introduce a player by identifying an online character of the player using communications with a mobile device carried by each player. Although the participants at the real-world gatherings are referred to as "players," they can be users, consumers, or participants of online social networks other than games.

In another implementation, each player checks in at the real-world gathering and obtains some benefit within online game(s) as a reward. The reward can be tied to a specific online game action, such as forming a clan with other players who were at the real-world gathering. Thus, the player can organize and host event(s) and gain additional perks or points based on the number of people who participate in the event(s). This type of reward system promotes growth in size and interest of the online community and enables expansion of social networking to the real-world. That is, when the players are able to network and meet other players in person and actually become real-world friends, the game will be a common bond and the friendship will increase the loyalty of the players to the online community as well.

In yet another implementation, GPS enabled mini-games can be created for the mobile devices used by the players at the real-world gathering. In one example, once the players are in a same location of the real-world gathering, they are encouraged through the mobile device to find a certain number of different character types (e.g., find all the craft guilders who are at the real-world gathering) within the common online game(s). The game provider can reward those players who accept the assignment (of finding online character types at the real-world gathering) by rewarding them, for example, with a power up buff in the online game. This will encourage the players at the real-world gathering to mingle and meet other players of the online game.

In another example, players playing games at home are encouraged to track gatherings on a map and to send/receive messages/tips to and from the players at the gatherings.

Mobile devices with GPS and 3-G functionality can be used by the players at the gatherings to communicate with a server side service that tracks the locations and details of the gathering and provide the positional data of the gatherings and the players. The current game network system (e.g., PlayStation Network System) can be leveraged to allow communications between the players playing the game at home and the players at the real-world gathering.

In yet another example, a group of players attending a real-world gathering can be encouraged to play a game in the real-world at the gathering or event. The game to be played can be based on similar actions or occurrences as those in an online game. Thus, a player can play out the virtual game in the real-world by teaming up with other players who are in the same team in the online game. In a slight variation, the real-world interactions at a gathering can be tied back into the online game in which players at home can join.

FIG. 1 is a flowchart 100 illustrating a process for coordinating real-world gatherings to promote an online community in accordance with one implementation of the present invention. The process for coordinating a real-world gathering involves encouraging online participants such as players of online game(s) to come to the real-world gathering by providing incentives, at box 110, for the online participants to participate. At box 120, familiarity is promoted among online participants by providing and introducing titles, characters, and/or guild memberships of other participants (e.g., players within common online game(s)) at the real-world gathering. For example, a promoter (e.g., a game service provider) can use the data collected within the online game(s) to introduce the participant/player by identifying an online character of the participant/player using communications with a mobile device carried by each participant/player.

At the real-world gathering, each participant checks in, at box 130, to obtain some online benefits or rewards, at box 140. The reward can be tied to a specific online game action, such as forming a clan with other players who were at the real-world gathering. Thus, the participant can organize and host event(s) and gain additional perks or points based on the number of people who participate in the event(s). This type of reward system promotes growth in size and interest of the online community and enables expansion of social networking to the real-world. That is, when the participants are able to network and meet other participants in person and actually become real-world friends, the game will be a common bond and the friendship will increase the loyalty of the participants to the online community as well.

At the real-world gathering, the participants are encouraged to join and play games or other social interactions with other participants physically participating at the gathering or online at home, at box 150. The games or social interactions can be created for mobile devices used by the participants at the real-world gathering. In one example, once the participants are in a same location of the real-world gathering, they are encouraged through the mobile device to find a certain number of different character types (e.g., find all the craft guilders who are at the real-world gathering within common online game(s)) of an online community. The game provider can reward those participants who accept the assignment (of finding online character types at the real-world gathering) by rewarding them, for example, with a power up buff in the online community. This will encourage the participants at the real-world gathering to mingle and meet other participants from the online community.

Further, at box 160, participants participating in an online community at home are enabled to track the real-world gatherings on a map and to send/receive messages/tips to and from the participants at the gatherings. Mobile devices with GPS and 3-G functionality can be used by the participants at the gatherings to communicate with a server side service that tracks the locations and details of the gathering and provide the positional data of the gatherings and the participants. The current game network system (e.g., PlayStation Network System) can be leveraged to allow communications between the participants playing the game at home and the participants at the real-world gathering.

FIG. 2A shows a detailed description of the benefit/reward for the participant who checks in at the real-world gathering. In one implementation, shown in box 200, the reward for participating by checking in at the real-world gathering is to allow the participants of the gathering to form a clan within the online community. FIG. 2B shows a detailed description of the reward for the participants who play a game at the real-world gathering. In one implementation, shown in box 210, the reward for the participants who play a game at the real-world gathering is power-up buffs in the online community.

Figure 3:
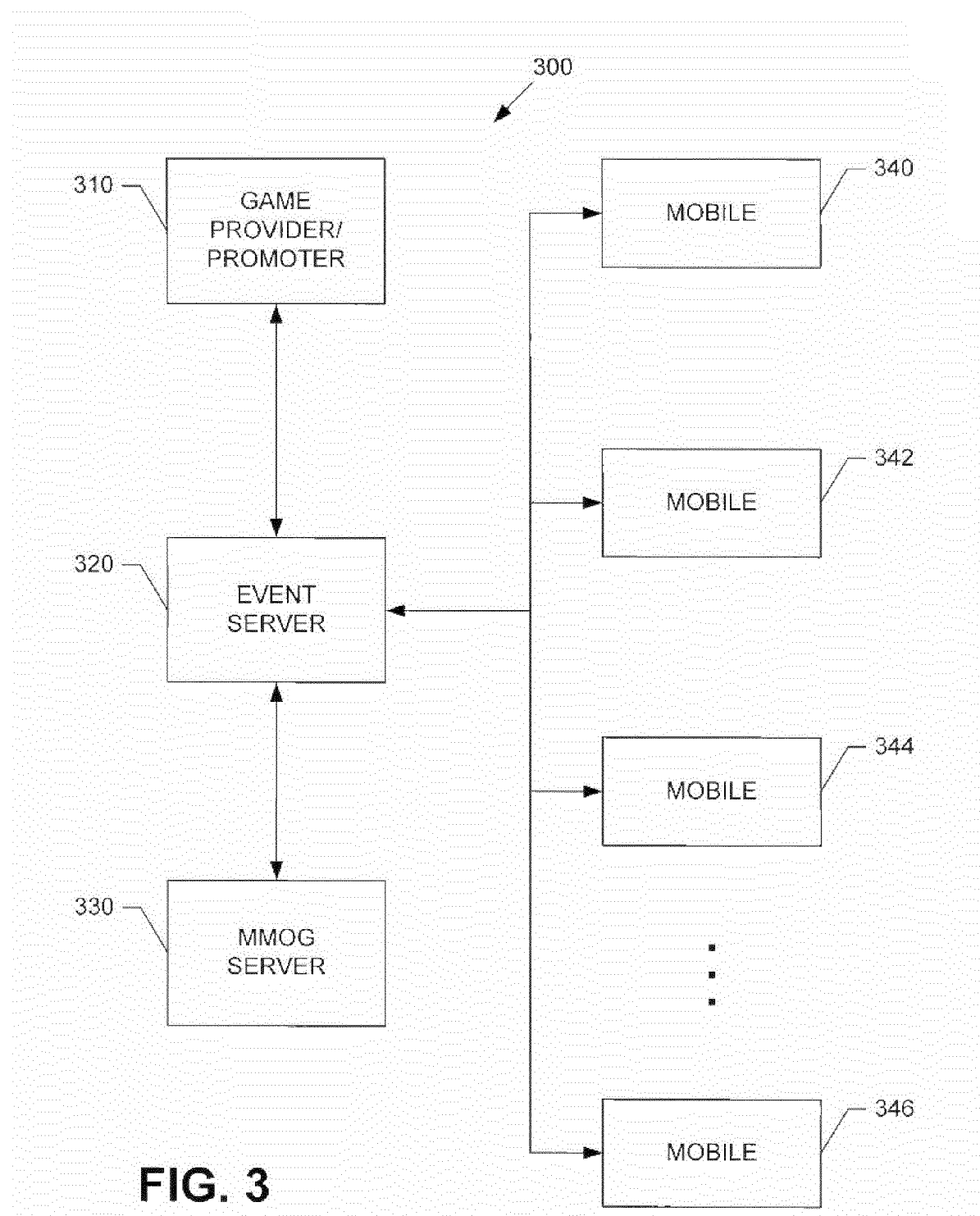
FIG. 3 is a block diagram of a system for coordinating real-world gatherings to promote an online community in accordance with one implementation of the present invention.

FIG. 3 is a block diagram of a system 300 for coordinating real-world gatherings to promote an online community in accordance with one implementation of the present invention. The system 300 for coordinating a real-world gathering includes a game provider/promoter 310, an event server 320, a game server 330, and a plurality of mobile devices 340, 342, 344, 346 representing participants in the gathering. In the system 300, the game provider 310 encourages online participants such as players of online game(s) to come to the real-world gathering by providing incentives for the online participants to participate in the gathering. The event server 320 promotes familiarity among online participants by providing and introducing titles, characters, and/or guild memberships of other participants (e.g., players within common online game(s)) at the real-world gathering. For example, the data collected within online game(s) is used to introduce the participants/players by identifying online characters of the participants/players using communications with mobile devices 340, 342, 344, 346 carried by the participants/players.

At the real-world gathering, each participant checks in using the mobile device 340, 342, 344, 346 to verify the participant's presence at the gathering by communicating with the event server 320 through a check-in device physically located at the gathering. In one implementation, the check-in device is configured as yet another mobile device similar to the mobile devices 340, 342, 344, 346. When the mobile device 340, 342, 344, 346 checks in at the gathering, it is allowed to obtain some online benefits or rewards. The reward can be tied to a specific online game action, such as forming a clan with other players who were at the real-world gathering. Thus, the participant can organize and host event (s) and gain additional perks or points based on the number of people who participate in the event(s).

At the real-world gathering, the participants are encouraged to join and play games or other social interactions with other participants physically participating at the gathering or online at home. The games or social interactions can be created for mobile devices 340, 342, 344, 346 used by the participants at the real-world gathering. In one example, once the participants are in a same location of the real-world gathering, they are encouraged through the mobile device 340, 342, 344, 346 to find a certain number of different character types (e.g., find all the craft guilders who are at the real-world gathering within common online game(s)) of an online community. The game provider 310 can reward those participants who accept the assignment (of finding online character types at the real-world gathering) by rewarding them, for example, with a power up buff in the online community. This will encourage the participants at the real-world gathering to mingle and meet other participants from the online community.

Further, participants participating in an online community such as an online game tied to the massively multiplayer online game (MMOG) server 330 at home are enabled to track the real-world gatherings on a map and to send/receive messages/tips to and from the participants at the gatherings. Mobile devices 340, 342, 344, 346 with GPS and 3-G functionality can be used by the participants at the gatherings to communicate with a server side service 320 that tracks the locations and details of the gathering and provide the positional data of the gatherings and the participants. The current game network system (e.g., PlayStation Network System) can be leveraged to allow communications between the participants playing the game at home and the participants at the real-world gathering.

Figure 4A:
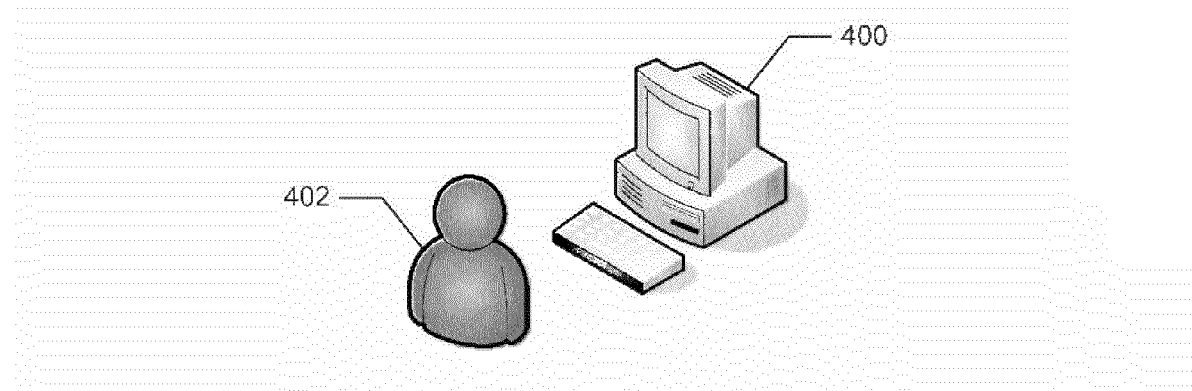
FIG. 4A illustrates a representation of a computer system and a user.

FIG. 4A illustrates a representation of a computer system 400 and a user 402. The user 402 uses the computer system 400 to coordinate real-world gatherings to promote an online community. The computer system 400 stores and executes an event coordinator 490.

Figure 4B:
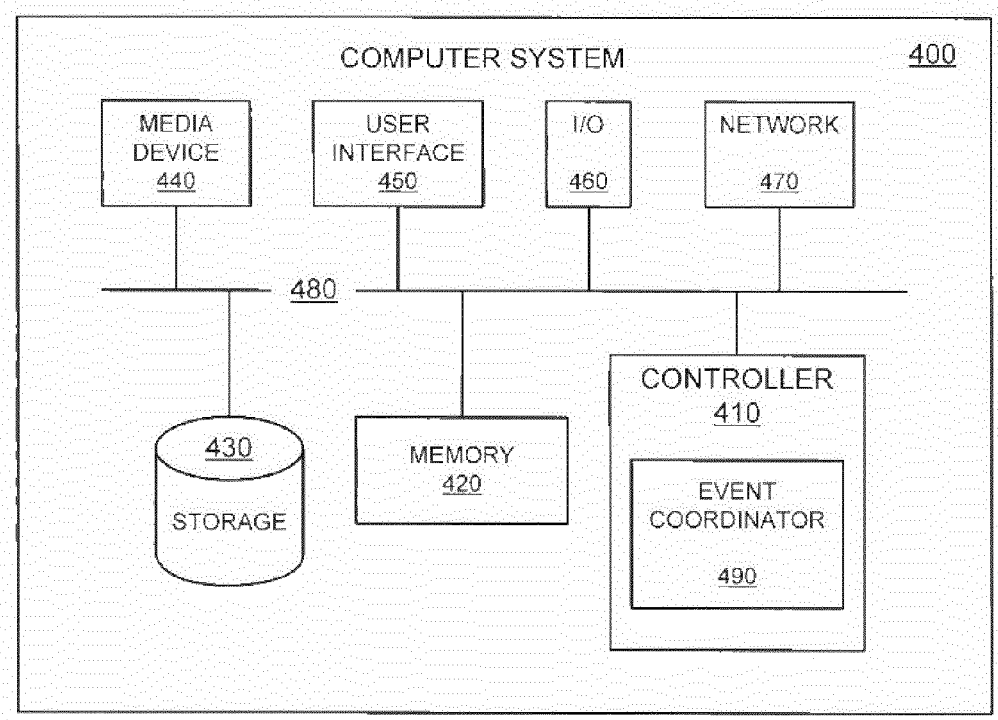
FIG. 4B is a functional block diagram illustrating the computer system hosting the event coordinator.

FIG. 4B is a functional block diagram illustrating the computer system 400 hosting the event coordinator 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the event coordinator 490 as a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the event coordinator 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. Although the GPS device is discussed with respect to tracking the participants at the gathering, it should be understood that any location providing/tracking device including but not limited to the fidelity of tracking that traditional GPS provides can be used in place of the GPS device. For example, the ability to access a Wifi hot spot can provide the tracking of the participants. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of coordinating real-world gathering to expand and promote an event associated with a community of an online game, the method comprising:
    encouraging players of the online game community to participate in a real-world gathering by providing incentives for participants at the real-world gathering,
    wherein the real-world gathering is an event separate from the online game to expand and promote the online game community;
    promoting familiarity among the participants by providing and introducing online game community titles of the participants at the real-world gathering;
    providing online benefits and rewards to the participants for participating in the real-world gathering;
    enabling online participants of the real-world gathering to track the real-world gathering on a map; and
    enabling the online participants to communicate with the participants at the real-world gathering,
    wherein the communication between the online participant and the participants at the real-world gathering includes sending messages and tips.

2. The method of claim 1, wherein the online game is a massively multiplayer online game (MMOG) and the participants are players of the MMOG.

3. The method of claim 1, wherein the incentives include allowing the participants at the real-world gathering to form a clan within the online game.

4. The method of claim 1, further comprising
    encouraging the participants at the real-world gathering to physically participate in a social interaction with other participants at the real-world gathering,
    wherein the social interaction includes a real-world game to introduce each other.

5. The method of claim 4, wherein the participants at the real-world gathering physically participate in the social interaction using a mobile device.

6. The method of claim 4, wherein the real-world game includes an assignment to find a certain number of different character types of the participants at the real-world gathering.

7. The method of claim 4, wherein a reward for those participants physically participating in the social interaction includes
a power up buff in the online game.

8. The method of claim 1, wherein the participants can participate in the real-world gathering using a mobile device; and further comprising
enabling the participants to provide the positional data of the participants at the real-world gathering to the online participants.

9. The method of claim 1, further comprising
leveraging a network system of a current game being played by the online participant to:
enable the online participants to monitor the real-world gathering; and
enable communications between the participants at the real-world gathering and the online participants.

10. The method of claim 1, wherein the online game titles of the participants at the real-world gathering are provided from data collected within the online game by a promoter.

11. The method of claim 1, further comprising
encouraging the players of the online game to organize and host the real-world gathering by providing additional perks or points based on a number of people who participate in the real-world gathering.

12. A non-transitory tangible storage medium storing a computer program for coordinating real-world gathering to promote an event associated with a community of an online game, the computer program comprising executable instructions that cause a computer to:
encourage players of the online game community to participate in a real-world gathering by providing incentives for participants at the real-world gathering,
wherein the real-world gathering is an event separate from the online game to expand the online game community;
promote familiarity among the participants by providing and introducing online game community titles of the participants at the real-world gathering through a mobile device used by each participant;
provide online benefits and rewards to the participants for participating in the real-world gathering;
enable online participants of the real-world gathering to track the real-world gathering on a map; and
enable the online participants to communicate with the participants at the real-world gathering,
wherein the communication between the online participant and the participants at the real-world gathering includes sending messages and tips.

13. The non-transitory tangible storage medium of claim 12, wherein the online game is a massively multiplayer online game (MMOG) and the participants are players of the MMOG.

14. The non-transitory tangible storage medium of claim 12, further comprising executable instructions that cause a computer to
communicate with the mobile device to encourage the participants at the real-world gathering to physically participate in a social interaction with other participants at the real-world gathering.

15. The non-transitory tangible storage medium of claim 14, wherein the social interaction includes
an assignment to find a certain number of different character types of the participants at the real-world gathering.

16. The non-transitory tangible storage medium of claim 15, wherein a reward for those participants physically participating in the social interaction includes
a power up buff in the online game.

17. The non-transitory tangible storage medium of claim 12, further comprising executable instructions that cause a computer to leverage a network system of a current game being played by the online participant to:
enable the online participants to monitor the real-world gathering; and
enable communications between the participants at the real-world gathering and the online participants.

18. The non-transitory tangible storage medium of claim 12, further comprising executable instructions that cause a computer to
encourage the players of the online game community to organize and host the real-world gathering by providing additional perks or points based on a number of people who participate in the real-world gathering.

* * * * *